(12) United States Patent
Rivolta et al.

(10) Patent No.: US 12,265,199 B2
(45) Date of Patent: Apr. 1, 2025

(54) MICROELECTROMECHANICAL SYSTEM AND CORRESPONDING METHOD FOR WEATHER PATTERN RECOGNITION

(71) Applicant: STMICROELECTRONICS S.r.l., Agrate Brianza (IT)

(72) Inventors: Stefano Paolo Rivolta, Desio (IT); Lorenzo Bracco, Chivasso (IT); Roberto Mura, Milan (IT); Federico Rizzardini, Settimo Milanese (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 1115 days.

(21) Appl. No.: 17/099,582

(22) Filed: Nov. 16, 2020

(65) Prior Publication Data
US 2021/0158190 A1    May 27, 2021

(30) Foreign Application Priority Data
Nov. 26, 2019 (IT) .................. 102019000022188

(51) Int. Cl.
| | |
|---|---|
| *G06F 18/214* | (2023.01) |
| *G01W 1/02* | (2006.01) |
| *G06F 18/243* | (2023.01) |
| *G06N 5/04* | (2023.01) |
| *G06N 20/00* | (2019.01) |
| *G16Y 20/10* | (2020.01) |

(52) U.S. Cl.
CPC ........... *G01W 1/02* (2013.01); *G06F 18/2148* (2023.01); *G06F 18/24323* (2023.01); *G06N 5/04* (2013.01); *G06N 20/00* (2019.01); *G16Y 20/10* (2020.01)

(58) Field of Classification Search
CPC ....... G01W 1/02; G01W 1/10; G06F 18/2148; G06F 18/24323; G06N 5/04; G06N 20/00; G16Y 20/10
See application file for complete search history.

(56) References Cited

U.S. PATENT DOCUMENTS

| | | | |
|---|---|---|---|
| 2004/0252027 A1* | 12/2004 | Torkkola ................ | G08B 21/06 340/576 |
| 2008/0285385 A1* | 11/2008 | Cherry .................... | G01V 1/008 367/76 |
| 2017/0286838 A1* | 10/2017 | Cipriani ................ | G06N 20/00 |
| 2019/0271563 A1 | 9/2019 | Pandit et al. | |
| 2020/0081153 A1* | 3/2020 | Schiff .................... | G01H 11/08 |
| 2020/0378357 A1* | 12/2020 | Louazel ................... | F03D 9/25 |

FOREIGN PATENT DOCUMENTS

JP            2018173342 A    * 11/2018

* cited by examiner

*Primary Examiner* — John T Repsher, III
(74) *Attorney, Agent, or Firm* — Seed IP Law Group LLP

(57) ABSTRACT

A microelectromechanical weather pattern recognition system includes: at least one movement sensor, of a MEMS type, which generates a movement signal, in the presence and as a function of at least one weather pattern to be recognized; and a recognition circuitry, which is coupled to the movement sensor and which receives the movement signal; extracts given features of the movement signal; and perform processing operations, based on the given features of the movement signal, in order to recognize the weather pattern by executing at least one, appropriately trained, machine-learning algorithm.

18 Claims, 7 Drawing Sheets

| a | b | c | d | e | f |
|---|---|---|---|---|---|
| 20.37 | 1.13 | 0 | 0 | 0 | 0 |
| 5.66 | 14.71 | 0 | 1.13 | 0 | 0 |
| 0 | 1.95 | 19.55 | 0 | 0 | 0 |
| 0 | 0 | 1.48 | 20.02 | 0 | 0 |
| 0 | 0 | 0 | 0 | 21.5 | 0 |
| 0 | 0 | 0 | 0 | 0 | 21.5 |

MICROELECTROMECHANICAL SYSTEM AND CORRESPONDING METHOD FOR WEATHER PATTERN RECOGNITION

BACKGROUND

Technical Field

The present solution relates to a microelectromechanical system for weather pattern recognition and to a corresponding method.

Description of the Related Art

A wide range of electronic systems are known, for example in the domotics, the automotive filed, or in general in the so-called IoT (Internet of Things) field, where activation or management of given devices or functions occur upon detection of a particular weather or environmental condition.

Purely by way of example, recognition of a rain condition may automatically determine closing of windows, stop of an irrigation system, activation of windscreen wipers in a motor vehicle, and so forth; recognition of a wind condition may automatically determine closing of verandas or venetian blinds, activation of turbines in wind-power plants, and so forth; and recognition of a hail condition can activate an automatic-recording system (datalogger) for the insurance coverage purposes.

Currently, in the aforesaid systems and in order to recognize weather patterns, sensors of an analog or discrete type are used, i.e., ones that are not made with manufacturing techniques typical of semiconductor materials. For instance, rain-sensor circuitrys in irrigation plants may comprise a hygroscopic element and an electrical switch coupled to the hygroscopic element; wind-sensor circuitrys may comprise an anemometer.

In general, for each weather pattern that is to be recognized a dedicated sensor is typically utilized, so that several sensors are generally used to recognize a wide range of weather patterns.

Use of the aforesaid sensors in general leads to a high occupation of area and a high electric-power consumption and moreover leads to problems of interfacing of the same sensors with digital processing units, for example microprocessor units, requiring purposely designed interfaces and analog-to-digital conversion circuits.

Consequently, the corresponding recognition systems are in general complex and costly, and are therefore not indicated for fields of application, such as the IoT, automotive, or domotics fields where the reduction in size and costs are typically primary design requirements.

BRIEF SUMMARY

The present disclosure provides a solution that will enable, among others, the disadvantages highlighted previously associated with known solutions to be overcome.

According to the present disclosure, a microelectromechanical system for weather pattern recognition and a corresponding method are therefore provided.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein.

DETAILED DESCRIPTION

As will be described in detail hereinafter, one aspect of the present solution uses at least one MEMS (Micro-Electro-Mechanical System) movement sensor for recognition of at least one weather pattern (preferably, in a joint manner, for recognition of several and different weather patterns), based on processing of some features of the signal detected by the same MEMS movement sensor.

In one embodiment, which enables a general optimization of electric-power consumption, the movement sensor is a MEMS accelerometer, preferably with three detection axes.

Figure 1:
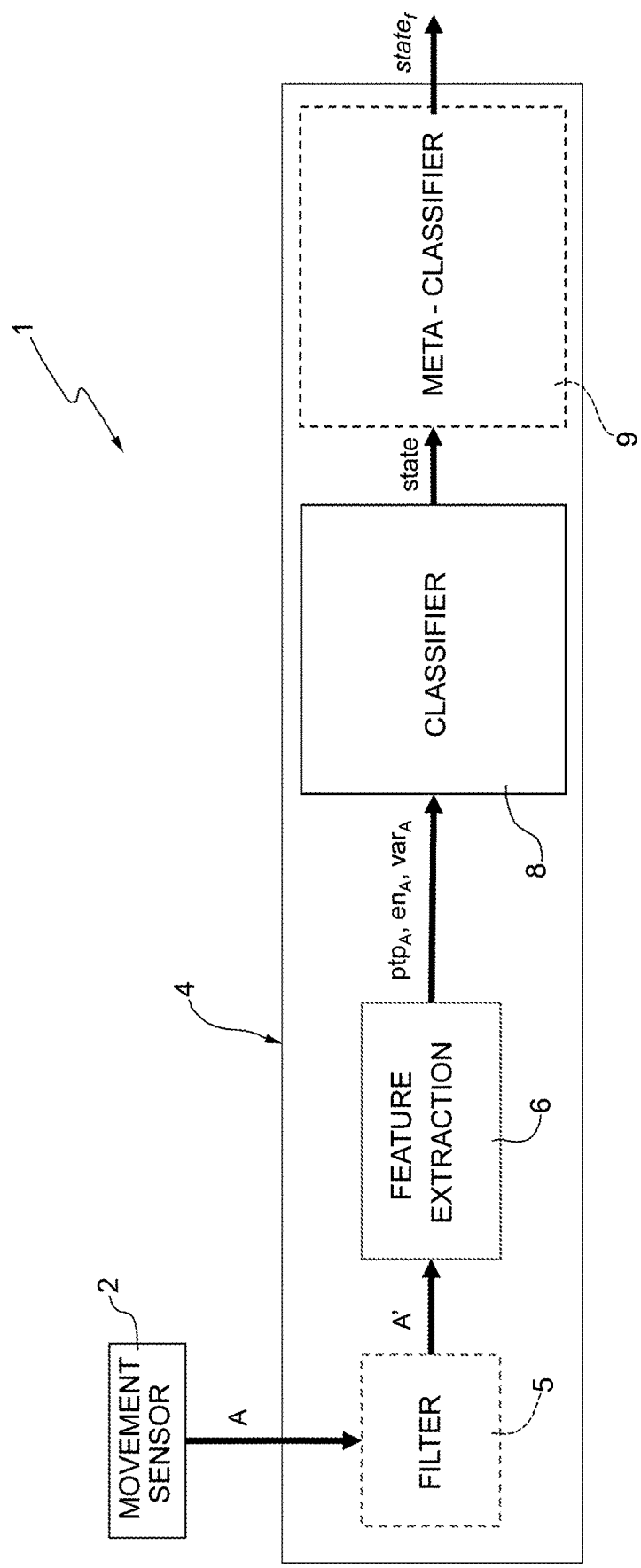
FIG. 1 shows a schematic block diagram of a microelectromechanical system for weather pattern recognition according to one embodiment of the present solution.

With initial reference to FIG. 1, a weather pattern recognition system 1 of a MEMS type, configured to perform recognition of weather patterns, is now described.

The weather pattern recognition system 1 comprises at least one movement sensor 2, of a MEMS type, configured to generate a movement signal A, in the presence and as a function of at least one weather pattern to be detected; in particular, the movement sensor 2 is a triaxial sensor, and the movement signal has respective components Ax, Ay, Az along three detection axes x, y, z of a Cartesian reference system associated with the same movement sensor 2.

In one embodiment, the movement sensor 2 is a MEMS accelerometer sensor, the movement signal A is an acceleration signal, and the aforesaid components Ax, Ay, Az are the components of acceleration acting along the three detection axes x, y, z.

The weather pattern recognition system 1 further comprises recognition circuitry 4 (which may be referred to herein as a recognition circuitry 4), coupled to the movement sensor 2 and configured to receive the movement signal A and perform processing operations based on given features of the same movement signal A in order to recognize the weather pattern (or, as will be discussed hereinafter, weather patterns). The recognition circuitry 4 may include or otherwise be implemented in any suitable circuitry, which in some embodiments may include processing circuitry, a microprocessor, embedded memory, like EEPROM, or the like.

The aforesaid recognition circuitry 4 comprises, optionally and not necessarily, an input filtering stage 5, which receives the movement signal A and the respective components Ax, Ay, Az and implements an appropriate filtering of the movement signal A to generate a filtered movement signal A', with respective components Ax', Ay', Az'.

The filtering implemented may, for example, be of a low-pass type, e.g., to remove high-frequency components, a high-pass type, e.g., to remove a DC component of the movement signal A, or a bandpass type, e.g., to select a frequency band of interest, based on, for example, the type of application, the operating environment, or the features of the movement signal A.

The recognition circuitry 4 further comprises a feature-extraction stage 6, which is coupled (in the embodiment illustrated) to the output of the filtering stage 5 and receives the filtered movement signal A'. If the input filtering stage 5 is not present, the aforesaid feature-extraction stage 6 is directly coupled to the movement sensor 2 and receives at its input the raw, or non-filtered, movement signal A.

The feature-extraction stage 6 is configured to extract or obtain from the movement signal A, or from the aforesaid filtered movement signal A', given features, based on which to recognize a weather pattern.

According to one aspect of the present solution, the features extracted for the purposes of recognition of weather patterns are features that are independent of and immune from variations between one sensor and another, for example, as a result of offset, bias, or other similar phenomena due, for example, to the manufacturing process or ageing phenomena, such as: the peak-to-peak amplitude $ptp_A$ calculated on the modulus or Euclidean norm of the movement signal A or of the filtered movement signal A' or on at least one component of the same movement signal A or of the filtered movement signal A' along at least one of the detection axes x, y, z; the variance $var_A$ calculated on the modulus or Euclidean norm or on the at least one component of the movement signal A or of the filtered movement signal A; the energy $en_A$ calculated on the modulus or Euclidean norm or on the at least one component of the movement signal A or of the filtered movement signal A'.

The recognition circuitry 4 further comprises a processing stage 8, coupled to the output of the feature-extraction stage 6 and configured to perform appropriate processing operations, within given time windows, based on the extracted features of the movement signal A or of the filtered movement signal A' in order to recognize the at least one weather pattern of interest, for example, a condition of rain, wind, or hail.

According to one aspect of the present solution, processing of the features of the movement signal (or of the filtered movement signal A') to recognize the weather patterns is carried out by machine-learning algorithms, that have been appropriately trained, as will be described more fully herein.

In particular, the processing stage 8 may implement a classifier, designed to classify the features of the movement signal or of the filtered movement signal A' into classes, each representing a given weather pattern recognized, via suitable assignment criteria defined by a classification algorithm based on machine learning, for example one that uses a decision tree. For instance, in a possible implementation, the classes may be associated with the weather patterns "rain", "hail", and "wind", possibly envisaging sub-classes defining an intensity (low, normal, or high) of the respective weather event.

The processing stage 8 therefore supplies at the output a "state", representative of the class, i.e., of the weather pattern recognized.

The recognition circuitry 4 may moreover comprise an output filtering stage 9, coupled to the output of the processing stage 8 and configured to carry out appropriate operations of filtering to increase the accuracy of detection of the weather pattern, e.g., at the expense of a possible increase in the latency of the recognition operations.

In the embodiment described previously, where the processing stage 8 implements a classifier, the aforesaid output filtering stage 9 may implement a so-called "meta-classifier", operating in a per-se known manner, not described in detail herein, and configured to carry out further operations of classification so as to supply at the output a final state, "$state_f$", representing the detected weather pattern.

It should be noted that, in a possible embodiment, the recognition circuitry 4 can be implemented in a processing unit, external to and distinct from the movement sensor 2, provided with a microprocessor, a microcontroller, or a similar processing unit, and a non-volatile memory that stores computing instructions for carrying out the processing operations discussed previously. This processing unit may be a dedicated control unit or may also have other functions (for example, for managing operation of an electronic apparatus in which the movement sensor 2 is incorporated).

Alternatively, the recognition circuitry 4 may be a hardware circuitry and be integrated in the same chip of the movement sensor 2 (which comprises in a known way an appropriate MEMS detection structure and a corresponding electronic interface circuit).

Figure 2A:
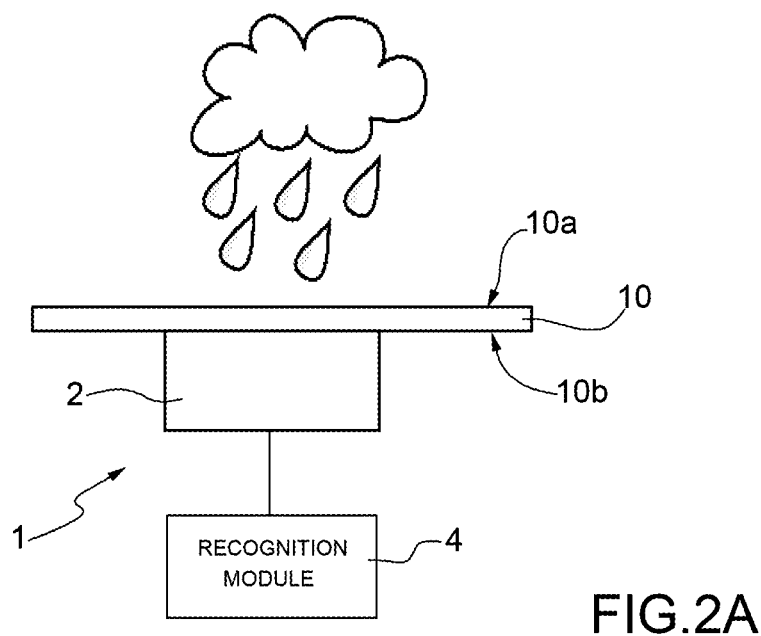
FIGS. 2A and 2B represent schematically an example of application of the system of FIG. 1 and a corresponding accelerometric signal associated with recognition of weather patterns, in particular rain/hail.

FIG. 2A is a schematic illustration of the weather pattern recognition system 1, in this case configured to detect a condition of rain or hail.

The movement sensor 2 is here coupled to a support 10, which, during operation, receives the rain or hail, made of an appropriate material adapted to transmit to the movement sensor 2 the vibrations associated with the rain or hail. For instance, the support 10 may be a plate, having a top surface 10a, e.g., lying in a horizontal plane xy, which is to receive the rain or hail, and a rear surface 10b, vertically opposite to the front surface 10a, e.g., along a vertical axis z, to which the movement sensor 2 is fixedly coupled.

The support 10 may, for example, be part of the bonnet or some other outer surface of a motor vehicle, e.g., in the case of application in the automotive field, or else be positioned on the roof or some other external element of a house, e.g., in the case of application in the domotics field.

Figure 2B:
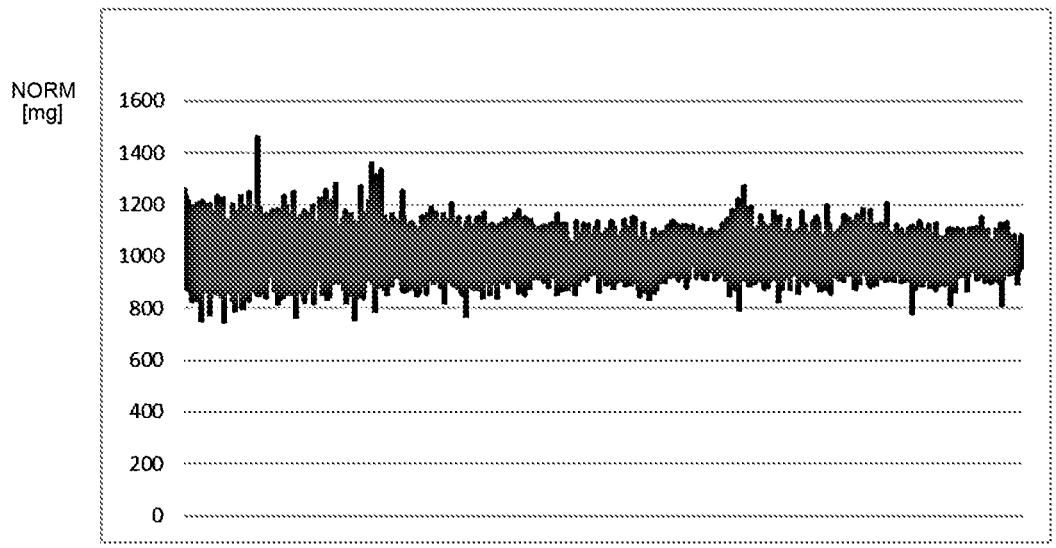

FIG. 2B shows the plot of a feature of the movement signal A. In the example, the movement sensor 2 is an accelerometer sensor, and the movement signal A is an acceleration signal, in this case a raw, i.e., non-filtered, signal, in particular of the modulus or Euclidean norm of the same movement signal A.

The norm has a reference value at rest, e.g., in the absence of the weather pattern, and significantly different values in the presence of the weather pattern. In the example, the rain (or hail) determines a pattern of vibrations on the support 10, which in turn determines a corresponding oscillatory plot of the norm of the movement signal A around the reference value.

The recognition circuitry 4, coupled, as discussed previously as an example, to the movement sensor 2, receives the movement signal A and processes the significant features thereof. In the example, the recognition circuitry 4 determines the norm of the movement signal A and one or more features among the peak-to-peak amplitude, the energy, and the variance of the same norm, and performs detection of the weather pattern, e.g., rain or hail, as a function of the processing of the aforesaid features.

It should be noted that the recognition circuitry 4 may, based on these features, not only determine the presence of the weather pattern, but also the intensity, for example low, normal, or high, of the same weather pattern.

FIG. 3A illustrates, once again schematically, the weather pattern recognition system 1, in this case configured to detect a condition of wind.

The movement sensor 2 is here coupled inside a casing 12, carried by a supporting element 14, elongated in the vertical direction, e.g., along the z axis, and having characteristics of elasticity. The supporting element 14 is, for example, coupled to the aforesaid casing 12 at a first end thereof and to the floor or to the ceiling at a second end thereof, longitudinally opposite to the first end.

Figure 3A:
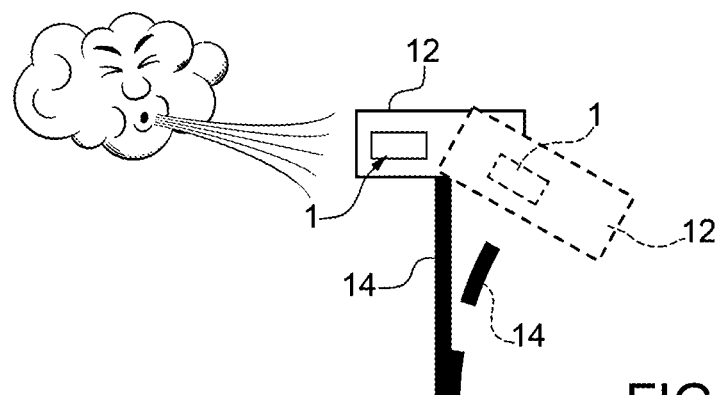
FIGS. 3A-3C represent schematically a further example of application of the system of FIG. 1 and corresponding accelerometric signals associated with recognition of weather patterns, in particular wind.

During operation, as shown schematically in FIG. 3a with a dashed line, the supporting element 14 bends in the presence of wind, e.g., the degree of bending being a function of the intensity of the wind, causing a variation of the movement signal A. In the example, the movement sensor 2 is once again an accelerometer, and the movement signal A is an acceleration signal, also in this case a raw, i.e., non-filtered, signal.

Figure 3B:
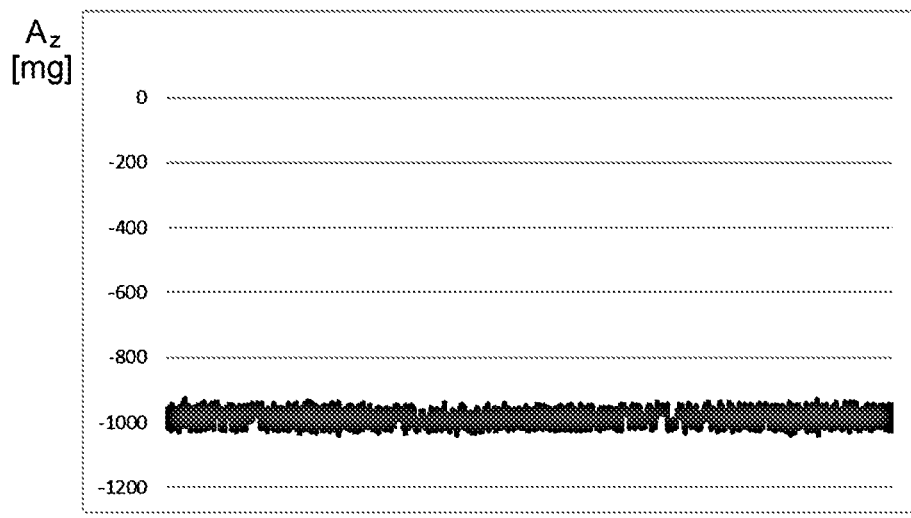
Figure 3C:
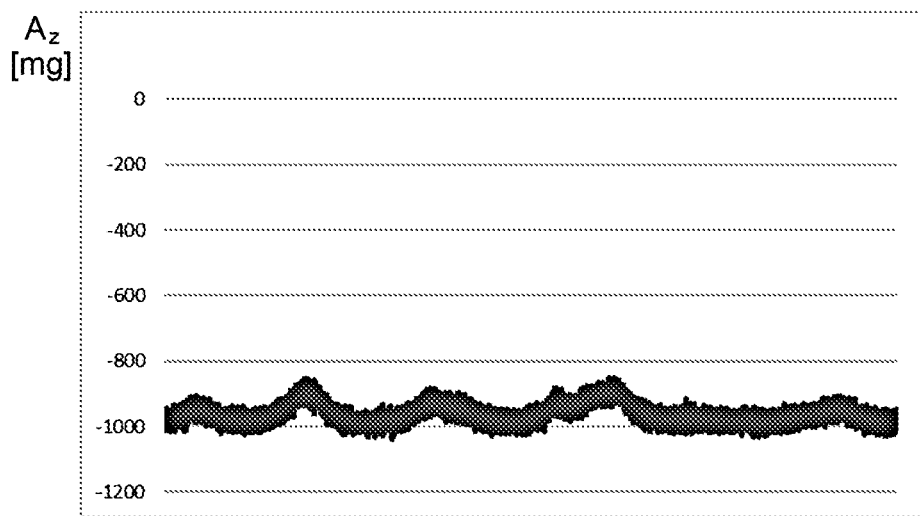

FIGS. 3B-3C show the plot of the component of the movement signal A along a vertical axis of detection (z axis) of the reference system fixed with respect to the movement sensor 2.

The aforesaid component has a reference value at rest, e.g., in the absence of the weather pattern, as shown in FIG. 3B, and significantly different values in the presence of the weather pattern, as shown in FIG. 3C.

It is noted that, if the surface of the casing 12 is struck by rain or hail and the casing itself is of a material suitable to transmit vibrations, the weather pattern recognition system 1 can be configured to recognize not only conditions of wind, but also conditions of rain and hail, in a joint manner based on the movement signal A detected by a single movement sensor 2.

A more detailed discussion of the operation of the processing stage 8 of the recognition circuitry 4 is now presented, with particular reference to the implementation of the machine-learning functions.

Figure 4:
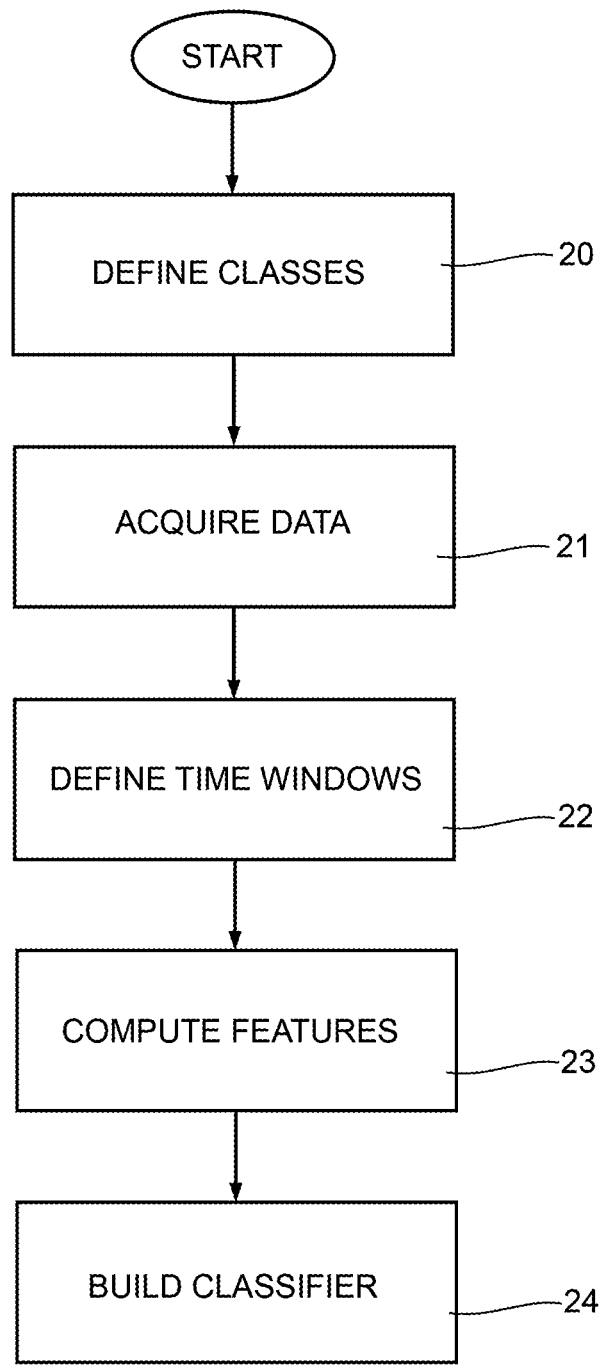
FIGS. 4-5 are flowcharts of operations performed by a processing circuitry, in particular based on machine learning, in the system of FIG. 1.

In this regard, FIG. 4 shows a flowchart regarding training operations of the classifier implemented by the aforesaid recognition circuitry 4, which implements in this case supervised learning techniques.

In an initial step, designated by 20, the classes to be recognized and the associated weather patterns, for example "rain", "wind", "hail", are defined, one of the classes corresponding to the absence of the aforesaid weather patterns.

A plurality of data are then gathered (log, step 21) for each of the aforesaid classes, with the weather pattern recognition system 1 and the corresponding movement sensor 2 arranged as in the final application: for example, data are acquired with the movement sensor A coupled to the support 10 (see FIG. 2A), in conditions of rain and in the absence of rain.

In particular (step 22), a time window is defined, for example of a few seconds (for example, 5 s), within which to carry out calculation of the features of the movement signal A. The duration of the time window can be appropriately modified also on the basis of a desired minimum output latency.

Next (step 23), within each time window the features of the movement signal A that are deemed to be most representative for characterizing the classes and the corresponding weather patterns are calculated. For instance, as discussed previously, these features may be the peak-to-peak amplitude, the variance, and the energy associated with the movement signal A; it is underlined, however, that other and/or further features can be calculated for increasing the accuracy, e.g., with the aim of achieving a desired compromise between accuracy and computational cost.

Based on the data acquired and the features calculated, the classifier is therefore built (step 24), which, at the end of the training step, will be ready for subsequent use in actual operating conditions.

Figure 5:
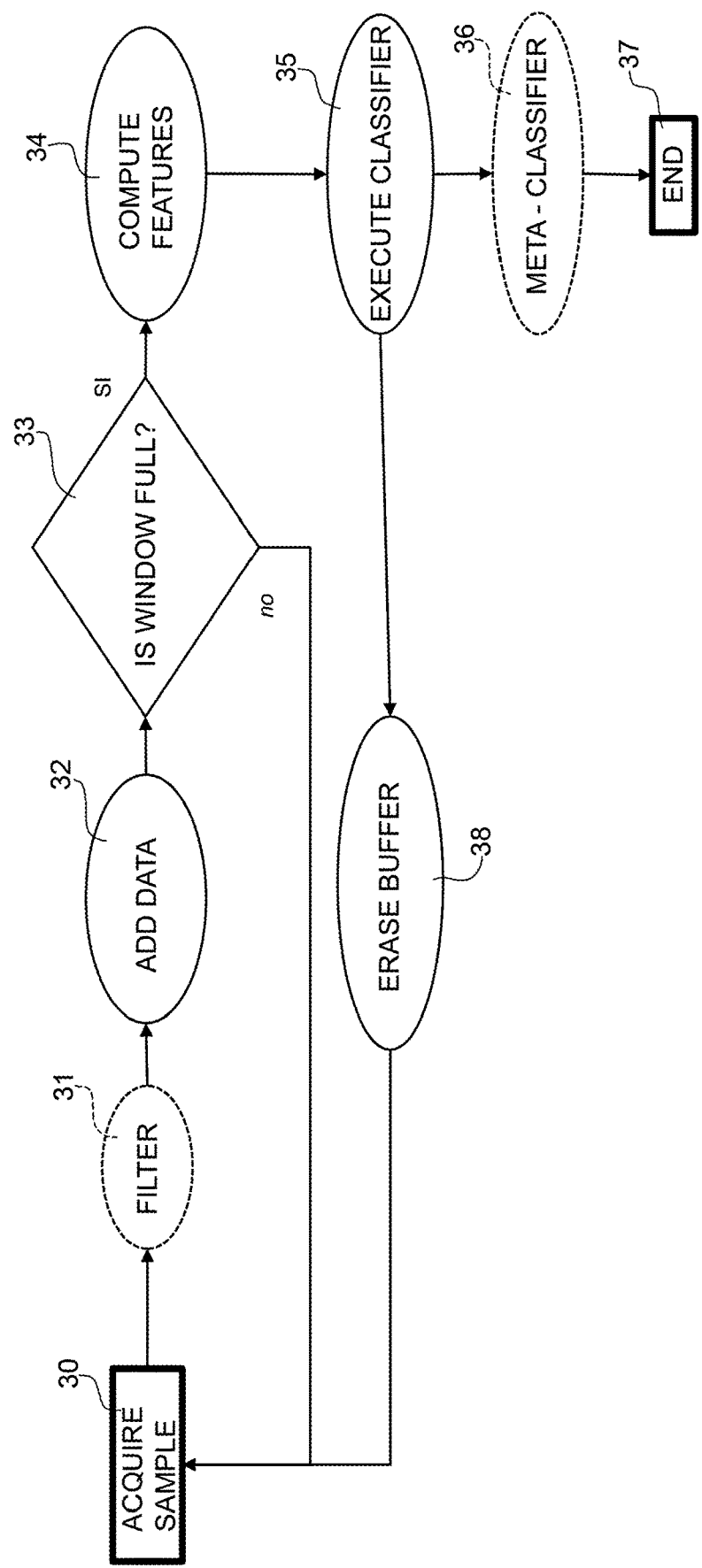

In this regard, FIG. 5 shows a flowchart regarding the operations of classification of the weather patterns, by the processing stage 8, carried out in real-time during operation of the weather pattern recognition system 1.

As shown in step 30, during operation, data (samples) associated with the movement signal A provided by the movement sensor 2 are acquired continuously in real-time.

These data (step 31) are optionally subjected to filtering or to further preliminary processing steps.

Then (step 32), the data are progressively added to the measurement time window, which in this case represents a data buffer.

As shown in step 33, it is assessed whether the time window is complete (i.e., whether the associated buffer is full of the samples acquired). It is noted that the duration of the time window coincides with the duration of the corresponding window used during training of the algorithm, for example, 5 s.

If the time window is not yet complete, the process returns to step 30, for acquisition of a new sample of the movement signal A.

Otherwise, if the time window is complete, in step 34 the features associated with the movement signal A are calculated. It is noted that these features are the same as those selected for creation of the classifier during the training step. For example, they comprise the peak-to-peak amplitude, the variance, and the energy associated with the movement signal A.

Based on the features calculated, in step 35, the classifier, which is the result of the training operations preliminarily carried out, is therefore applied, which supplies at the output the state, e.g., the weather pattern, corresponding to the time window processed.

This state may be possibly subjected to filtering by the output filtering stage 9, which in the example constitutes a meta-classifier, (step 36) to supply the effective output state, as shown in step 37.

Once the classifier has been applied, the data buffer is emptied (step 38), and the process returns to step 30 for acquisition of the new samples of the acceleration signal A.

Figure 6:
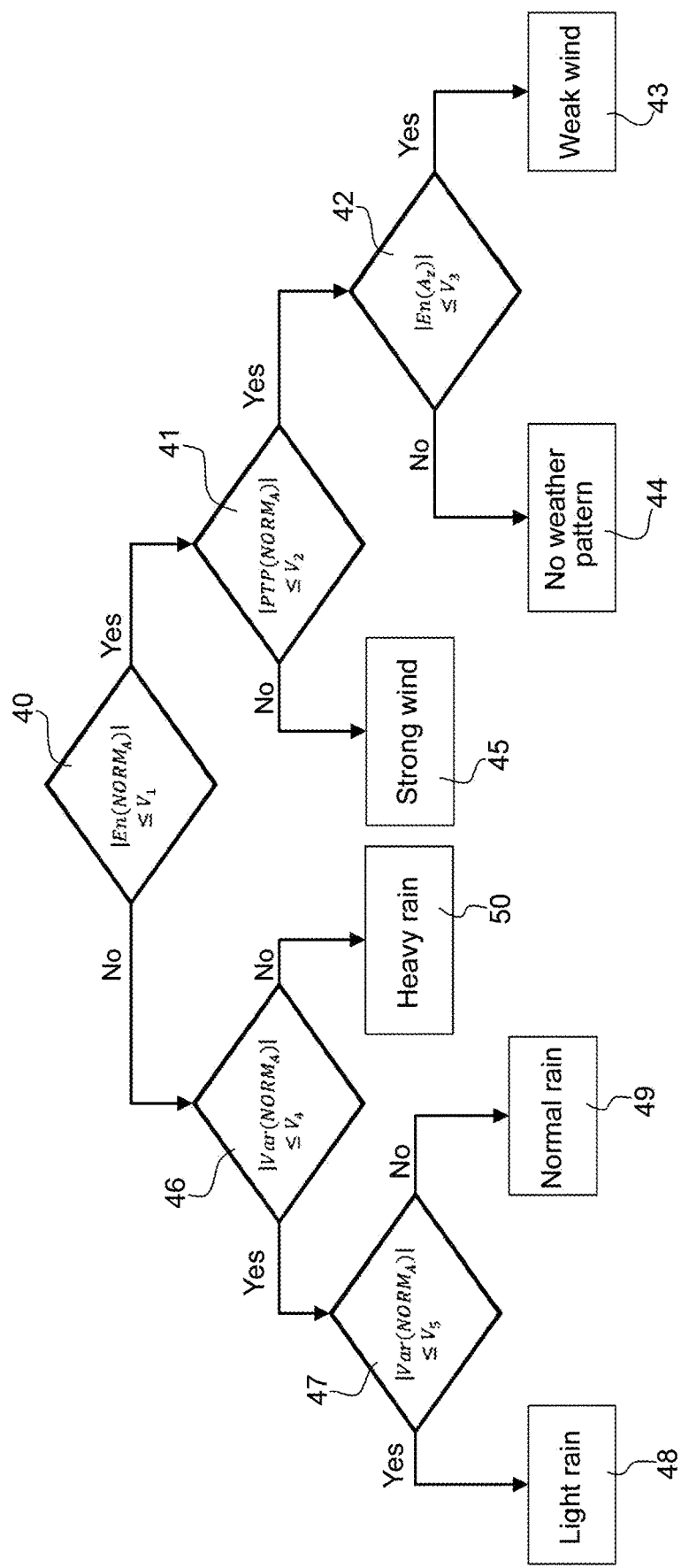
FIG. 6 shows a possible example of a decision tree implemented by a classifier in the processing circuitry in the system of FIG. 1.

With reference to FIG. 6, a possible example of decision tree is now illustrated, implemented by the classifier in the aforesaid processing stage 8 of the recognition circuitry 4.

As shown at node 40, the absolute value of the energy associated with the norm of the movement signal A is compared with a first value V1.

If this absolute value is lower than or equal to the first value V1, the process goes to the right-hand branch of the tree, and, at node 41, the absolute value of the peak-to-peak value associated with the norm of the movement signal A is compared with a second value V2.

If this absolute value is lower than or equal to the second value, the process goes to node 42, where the absolute value of the energy associated with the component of the movement signal A, in the example, along the z axis, is compared with a third value V3.

If this absolute value is lower than or equal to the third value V3, the decision tree leads to identification, in the leaf 43, of the state associated with the weather pattern "weak wind".

If, instead, this absolute value is higher than the aforesaid third value V3, the decision tree leads to identification, in the leaf 44, of the state associated with the absence of weather patterns.

If in the node 41 the absolute value of the peak-to-peak value associated with the norm of the movement signal A is instead higher than the second value V2, the decision tree leads to identification, in the leaf 45, of the state associated with the weather pattern "strong wind".

If in the node 40 the absolute value of the energy associated with the norm of the movement signal A is higher than the first value V1, the process goes to the left-hand branch of the tree, and, at node 46, the absolute value of the variance associated with the norm of the movement signal A is compared with a fourth value V4.

If this absolute value is lower than or equal to the fourth value V4, the process goes to node 47, where the same absolute value of the variance associated with the norm of the movement signal A is compared with a fifth value V5.

If this absolute value is lower than or equal to the fifth value V5, the decision tree leads to identification, in the leaf 48, of the state associated with the weather pattern "light rain".

If, instead, the aforesaid absolute value is higher than the fifth value V5, the decision tree leads to identification, in the leaf 49, of the state associated with the weather pattern "normal rain".

If, in the node 46, the absolute value of the variance associated with the norm of the movement signal A is higher than the fourth value V4, the decision tree leads to identification, in the leaf 50, of the state associated with the weather pattern "heavy rain".

Figures 7, 8:
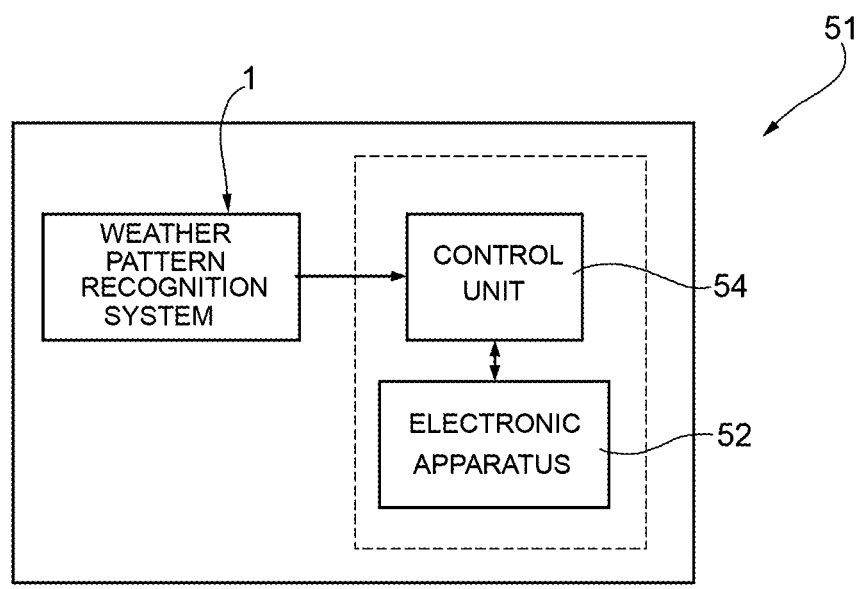
FIG. 7 shows the confusion matrix associated with the decision tree of FIG. 6.
FIG. 8 is a schematic block diagram of an electronic system, in which the system of FIG. 1 is implemented.

FIG. 7 shows the confusion matrix associated with the decision tree described previously, where:
  'a' indicates the class "absence of weather pattern";
  'b' indicates the class "weak wind";
  'c' indicates the class "strong wind";
  'd' indicates the class "light rain";
  'e' indicates the class "normal rain"; and
  'f' indicates the class "heavy rain".

In particular, the aforesaid confusion matrix highlights the accuracy of the classifier in recognizing the weather patterns.

It is underlined, in particular, that the aforesaid example relates to use of just one movement sensor 2, in particular a triaxial accelerometer, and use of the resulting raw, i.e., non-filtered, accelerometric signal.

The advantages of the present solution are clear from the foregoing description.

In any case, it is emphasized that the solution described is simple and inexpensive to implement and has reduced overall dimensions, thanks, in particular, to the use of MEMS movement sensors for recognition of the weather patterns.

The solution described can be implemented entirely in the digital domain, therefore being easy to interface with other devices or systems.

Moreover, this solution has a high configurability and re-usability for a wide range of applications. In particular, it is for example simple to add different or further movement sensors and detect different or further weather patterns.

Recognition of the weather patterns by the machine-learning techniques described is moreover very reliable: the present Applicant has in fact found an accuracy higher than 90% in the various experiments and tests conducted.

The aforesaid advantages render particularly advantageous the use of the weather pattern recognition system 1 in an electronic system, for example with applications in the domotics, automotive, or IoT fields.

In this regard, FIG. 8 shows an electronic system 51 that comprises the weather pattern recognition system 1 and an associated electronic apparatus 52, coupled to a control unit 54.

In particular, the control unit 54 is coupled to the output of the recognition circuitry 4 to receive the final state and the associated weather pattern recognized and to activate given functions of the electronic apparatus 52 according to the final state and associated weather pattern.

Finally, it is clear that modifications and variations may be made to what has been described and illustrated herein, without thereby departing from the scope of the present disclosure, as defined in the appended claims.

For instance, it is underlined that the solution described may envisage the use of a plurality of movement sensors (of a same type or of different types). For example, for further improving accuracy, a group of accelerometer sensors could be used, or else at least one gyroscopic sensor could be used in addition to the acceleration sensor.

Moreover, it is evident that different or further features of the movement signal to be processed could be envisaged for the purposes of recognition operations.

The recognition algorithms could also envisage the use of further, non-movement, sensors, for example temperature or pressure sensors, microphones or other types of environmental sensors to be used in addition to and in combination with the at least one movement sensor for the purposes of a further increase in the accuracy of recognition.

The classification algorithm could use different decision trees, for example ones that are also able to recognize the joint presence of weather patterns, for example the joint presence of rain and wind. Different artificial intelligence algorithms could moreover be used, for example neural networks, SVMs, Bayesian networks, etc.

The time windows used by the algorithm could moreover be of a sliding-window type, instead of being contiguous and temporally successive windows.

Furthermore, the recognition algorithm could possibly envisage also control of deterministic conditions associated with the features of the movement signal for recognition of the weather patterns.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical system, comprising:
   at least one microelectromechanical movement sensor that is configured to, in operation, generate a movement signal in response to a weather condition of an environment in which the at least one microelectromechanical movement sensor is positioned; and
   a processing circuitry that includes:
     a recognition circuitry coupled to the at least one microelectromechanical movement sensor, and the recognition circuitry configured to:
       receive the movement signal generated by the at least one microelectromechanical movement sensor at an input of the recognition circuitry;

filter the movement signal received at the input of the recognition circuitry coupled to the at least one microelectromechanical movement sensor, the movement signal is filtered into a filtered movement signal that includes one or more respective components;

extract a plurality of features from the filtered movement signal filtered from the movement signal received at the input of the recognition circuitry; and determine a plurality of weather patterns including a weather pattern of the weather condition by processing the plurality of features, wherein processing the plurality of features includes:

implementing at least one machine-learning algorithm trained to recognize the weather condition, wherein implementing the at least one machine-learning algorithm includes implementing a classification algorithm to classify the plurality of features into classes each representative of a respective weather pattern of the plurality of weather patterns, via assignment criteria defined by the classification algorithm, wherein the classification algorithm uses a decision tree, and using the decision tree includes:

comparing a first feature of the plurality of features to a first value at a first node of the decision tree:

when the first feature is greater than the first value, initiating performing a first branch of the decision tree by comparing a second feature to a second value at a second node along the first branch; and when the first feature is less than or equal to the first value, initiating performing a second branch of the decision tree by comparing a third feature to a third value at a third node along the second branch.

2. The microelectromechanical system according to claim 1, wherein the plurality of weather patterns are determined by processing the plurality of features extracted from the filtered movement signal within a time window to determine the plurality of weather patterns by implementing at least one machine-learning algorithm trained to recognize the plurality of weather patterns.

3. The microelectromechanical system according to claim 1, wherein the at least one microelectromechanical movement sensor is a triaxial accelerometric sensor, and the movement signal has respective components along three detection axes of a reference system associated with the triaxial accelerometric sensor.

4. The microelectromechanical system according to claim 3, wherein a feature of the plurality of features includes one or more of: a value of a peak-to-peak amplitude, a value of a variance, or a value of an energy calculated on a norm of the movement signal or on a component of the movement signal.

5. The microelectromechanical system according to claim 3, wherein the recognition circuitry is configured to, in operation, determine, based on the plurality of features of the filtered movement signal, one or more weather patterns of "rain", "hail", or "wind", and a weather condition of absence of the one or more weather patterns.

6. The microelectromechanical system according to claim 5, comprising a support that is designed to receive rain or hail, and is made of a material configured to generate a vibration in response to receiving the rain or hail, wherein the microelectromechanical movement sensor is coupled to the support and configured to detect the vibration.

7. The microelectromechanical system according to claim 5, comprising a supporting element and a casing on the supporting element, wherein the microelectromechanical movement sensor is coupled inside the casing, and the supporting element is configured to, in operation, bend in presence of wind.

8. The microelectromechanical system according to claim 1, wherein the recognition circuitry is integrated in a same chip with the microelectromechanical movement sensor.

9. An electronic system, comprising a weather pattern recognition system, and an electronic apparatus having a control unit, wherein the weather pattern recognition system includes:

a support that is made of a material adapted to transmit, to at least one microelectromechanical movement sensor coupled to the support, vibrations associated with rain or hail, wherein the support is configured to, in operation, receive the rain or hail and generate vibrations in response to receiving the rain or hail, and the at least one microelectromechanical movement sensor is configured to, in operation, to generate a movement signal based on the vibrations associated with the rain or hail in an environment in which the support and the microelectromechanical movement sensor are positioned; and a processing circuitry that is coupled to the at least one microelectromechanical movement sensor, the processing circuitry including:

a recognition circuitry coupled to the microelectromechanical movement sensor, and the recognition circuitry is configured to, in operation:

receive, at an input, the movement signal output by the microelectromechanical movement sensor;

extract a plurality of features from the movement signal received and output the plurality of features; and process the plurality of features to recognize a weather pattern by at least:

implementing at least one machine-learning algorithm trained to recognize the weather pattern, wherein implementing the at least one machine-learning algorithm includes implementing a classification algorithm to classify the plurality of features into classes each representative of a respective weather pattern of a plurality of weather patterns, via assignment criteria defined by the classification algorithm, wherein the classification algorithm uses a decision tree, and using the decision tree includes:

comparing a first feature of the plurality of features to a first value at a first node of the decision tree:

when the first feature is greater than the first value, initiating performing a first branch of the decision tree by comparing a second feature to a second value at a second node along the first branch; and when the first feature is less than or equal to the first value, initiating performing a second branch of the decision tree by comparing a third feature to a third value at a third node along the second branch; and wherein the control unit is coupled to the recognition circuitry to receive the weather pattern and to activate at least one function of the electronic apparatus according to the weather pattern.

10. The electronic system according to claim 9, wherein:
the weather pattern recognition system includes a supporting element and a casing on the supporting element;
the microelectromechanical movement sensor is within the casing;
the supporting element is configured to, in operation, bend in response to wind; and
the microelectromechanical movement sensor is configured to, in operation, detect the bending of the support element and generate the movement signal based on the bending detected by the microelectromechanical movement sensor.

11. A method, comprising:
generating, by at least one microelectromechanical movement sensor, a movement signal in response to a weather condition of an environment in which the at least one microelectromechanical movement sensor is positioned;
filtering the movement signal received into a filtered movement signal;
extracting a plurality of features of the filtered movement signal; and
determining a plurality of weather patterns including a weather pattern of the weather condition by analyzing the plurality of features extracted from the filtered movement signal, the analyzing the plurality of features extracted from the filtered movement signal includes:
implementing at least one machine-learning algorithm trained to recognize the weather condition, and implementing the at least one machine-learning algorithm includes implementing a classification algorithm to classify the plurality of features into classes each representative of a respective weather pattern of the plurality of weather patterns, via assignment criteria defined by the classification algorithm, the classification algorithm uses a decision tree, and using the decision tree includes:
comparing a first feature of the plurality of features associated with the filtered movement signal to a first value at a first node of the decision tree:
when the first feature is greater than the first value, initiating performing a first branch of the decision tree by comparing a second feature to a second value at a second node along the first branch; and
when the first feature is less than or equal to the first value, initiating performing a second branch of the decision tree by comparing a third feature to a third value at a third node along the second branch.

12. The method according to claim 11, further comprising training a classifier by:
defining the classes and respective weather patterns;
collecting, for each of the classes, a plurality of data associated with the filtered movement signal;
defining a time window;
calculating, within the time window, features of the filtered movement signal that characterize the classes and the respective weather patterns; and
building the classifier based on the plurality of data and the features.

13. The method according to claim 11, wherein the at least one microelectromechanical movement sensor is a triaxial accelerometric sensor, and the filtered movement signal has respective components along three detection axes of a reference system associated with the triaxial accelerometric sensor.

14. The method according to claim 13, wherein the plurality of features of the filtered movement signal includes ones of a value of a peak-to-peak amplitude, a value of a variance, or a value of an energy calculated on a norm of the filtered movement signal or on at least one component of the filtered movement signal.

15. The method of claim 11, further comprising:
when the second feature is greater than the second value at the second node, outputting a first state indicative of a first weather pattern of the plurality of weather patterns;
when the second feature is less than or equal to the second value at the second node, comparing a fourth feature to a fourth value at a third node along the first branch;
when the fourth feature is greater than the fourth value, outputting a second state indicative of a second weather pattern of the plurality of weather patterns;
when the fourth feature is less than or equal to the fourth value, outputting a third state indicative of a third weather pattern of the plurality of weather patterns;
when the third feature is greater than the third value at the third node, outputting a fourth state of a fourth weather pattern of the plurality of weather patterns;
when the third feature is less than or equal to the third value at the third node, comparing a fifth feature of the plurality of features to a fifth value at a fifth node along the second branch;
when the fifth feature is greater than the fifth value at the fifth node, outputting a fifth state indicative of a fifth weather pattern of the plurality of weather patterns; and
when the fifth feature is less than or equal to the fifth value at the fifth node, outputting a sixth state indicative of a sixth weather pattern of the plurality of weather patterns.

16. The method of claim 15, wherein:
the first weather pattern is heavy rain;
the second weather pattern is normal rain;
the third weather pattern is light rain;
the fourth weather pattern is strong wind;
the fifth weather pattern is no weather pattern; and
the sixth weather pattern is weak wind.

17. The method of claim 11, wherein the first feature, the second feature, and third feature are of different types.

18. The electronic system of claim 10, wherein the microelectromechanical movement sensor is a triaxial accelerometric sensor, and the movement signal has respective components along three detection axes of a reference system associated with the triaxial accelerometric sensor.

* * * * *